United States Patent [19]

Jackson, Jr.

[11] Patent Number: 5,419,470

[45] Date of Patent: May 30, 1995

[54] TOOL CARRYING SYSTEM INCLUDING A HOUSING MOUNTED ON A TRUCK AND INDIVIDUAL TOOL CARRIERS POSITIONABLE THEREIN

[76] Inventor: James S. Jackson, Jr., R.D. #1 Meadows Park, Post 2 Box 4, Arkport, N.Y. 14807

[21] Appl. No.: 248,100

[22] Filed: May 24, 1994

[51] Int. Cl.⁶ ............................................ B60R 11/06
[52] U.S. Cl. ............................ 224/42.32; 224/42.42; 224/273; 280/47.34; 312/270.1
[58] Field of Search ................... 224/42.32, 42.42, 273; 280/47.34, 47.35; 312/249.8, 270.1, 270.3, 330.1, 902

[56] References Cited

U.S. PATENT DOCUMENTS 4,957,228 9/1990 Balka ................................ 224/42.03

Primary Examiner—Henry J. Recla
Assistant Examiner—Peter S. Hrycko

[57] ABSTRACT

A tool carrying system including a housing mounted on a truck and individual tool carriers positionable therein comprising a rectangular housing having a parallel floor and roof, parallel sides, a parallel front wall and a door pivotally mounted at its lower edge to the lower rear edge of the floor, the door being of a height essentially equal to the height of the side walls of the housing for closing the rear open end of the housing and positionable in a open orientation to form an angled ramp for the sliding of the tool carriers to exterior of the housing; a plurality of tool carriers, each of the tool carriers being provided with a floor, and with upstanding side, front and rear walls coupled at their lower edge to the side, front and rear edges of the floor, and a handle having front and rear ends secured to the upper end of the front and rear walls with diagonal braces coupling an intermediate portion of the inner surface of each of the front and rear walls to the side walls; and the tool carriers each having on its lower surface a plurality of wheels, a wheel located in each corner.

5 Claims, 4 Drawing Sheets

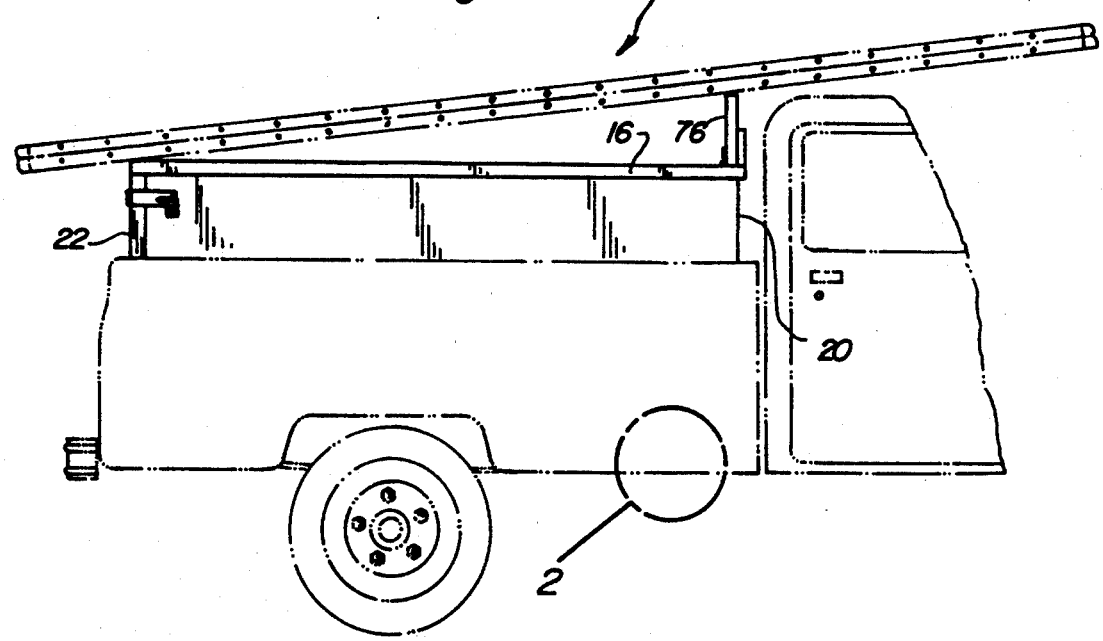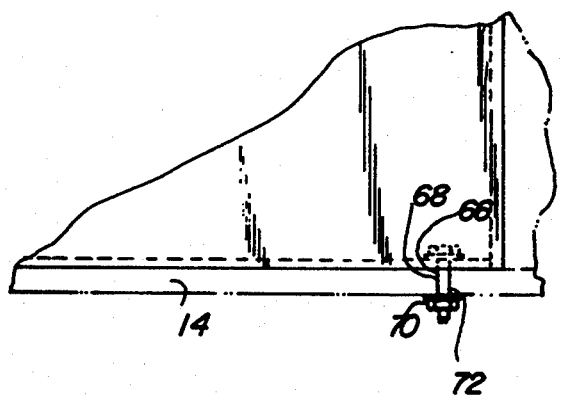

TOOL CARRYING SYSTEM INCLUDING A HOUSING MOUNTED ON A TRUCK AND INDIVIDUAL TOOL CARRIERS POSITIONABLE THEREIN

BACKGROUND OF THE INVENTION

1. Field of the Invention

The present invention relates to tool carrying system including a housing mounted on a truck and individual tool carriers positionable therein and more particularly pertains to storing and transporting tools in carriers removably positionable in a housing mounted to a truck.

2. Description of the Prior Art

The use of tool carriers of various designs is known in the prior art. More specifically, tool carriers of various designs heretofore devised and utilized for the purpose of supporting and transporting tools in containers of a wide variety of configurations are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,121,306 to Palmisano a tool compartment assembly for mounting on a pickup truck or like vehicle.

U.S. Pat. No. 5,088,636 to Barajas discloses a rolling tool box.

U.S. Pat. No. Des. 310,504 to Dortch discloses the design of a tool box drawer for a pickup truck.

U. S. Pat. No. 4,850,519 to Farmer, Jr. discloses an assemblable tool box for a pickup truck.

U.S. Pat. No. Des. 275,275 to Stapp discloses the design of a roller suspended tool box for pickup trucks or the like.

In this respect, the tool carrying system including a housing mounted on a truck and individual tool carriers positionable therein according to the present invention substantially departs from the conventional concepts and designs of the prior art, and in doing so provides an apparatus primarily developed for the purpose of storing and transporting tools in carriers removably positionable in a housing mounted to a truck.

Therefore, it can be appreciated that there exists a continuing need for new and improved tool carrying system including a housing mounted on a truck and individual tool carriers positionable therein which can be used for storing and transporting tools in carriers removably positionable in a housing mounted to a truck. In this regard, the present invention substantially fulfills this need.

SUMMARY OF THE INVENTION

In view of the foregoing disadvantages inherent in the known types of tool carriers of various designs now present in the prior art, the present invention provides an improved tool carrying system including a housing mounted on a truck and individual tool carriers positionable therein. As such, the general purpose of the present invention, which will be described subsequently in greater detail, is to provide a new and improved tool carrying system including a housing mounted on a truck and individual tool carriers positionable therein and method which has all the advantages of the prior art and none of the disadvantages.

To attain this, the present invention essentially comprises a new and improved tool carrying system including a housing mounted on a truck and individual tool carriers positionable therein comprising, in combination, a rectangular housing having a parallel floor and roof, parallel sides, a parallel front wall and a door pivotally mounted at its lower edge to the lower rear edge of the floor, the door having on the interior surface aluminum coverings to facilitate the movement of rollers thereacross the door being of a height essentially equal to the height of the side walls of the housing for closing the rear open end of the housing and positionable in a open orientation to form an angled ramp for the sliding of the tool carriers to exterior of the housing; a plurality of tool carriers, each of the tool carriers being provided with a floor, and with upstanding side, front and rear walls coupled at their lower edge to the side, front and rear edges of the floor, and a handle having front and rear ends secured to the upper end of the front and rear walls with diagonal braces coupling an intermediate portion of the inner surface of each of the front and rear walls to the side walls; the tool carriers each having on its lower surface a plurality of wheels, a wheel located in each corner, and along the side edges at an intermediate location therebetween; upwardly extending spacers positioned on the upper surface on the floor of the housing to divide the housing into two laterally offset zones each sized to receive one of the tool carriers; apertures formed in the floor of the housing adjacent to the leading edge with bolts and associated nuts adapted to hold the housing in position on the flat bed of a truck; and an upstanding support secured to the upper surface of the roof of the housing with hooks secured thereto and with associated hooks secured to the side walls of the housing adjacent to the rear end adapted to function as tie-downs for a ladder.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tool carrying system including a housing mounted on a truck and individual tool carriers positionable therein which have all the advantages of the prior art tool carriers of various designs and none of the disadvantages.

It is another object of the present invention to provide a new and improved tool carrying system including a housing mounted on a truck and individual tool carriers positionable therein which may be easily and efficiently manufactured and marketed.

It is further object of the present invention to provide a new and improved tool carrying system including a housing mounted on a truck and individual tool carriers positionable therein which are of durable and reliable constructions.

An even further object of the present invention is to provide a new and improved tool carrying system including a housing mounted on a truck and individual tool carriers positionable therein which are susceptible of a low cost of manufacture with regard to both materials and labor, and which accordingly are then susceptible of low prices of sale to the consuming public, thereby making such tool carrying system including a housing mounted on a truck and individual tool carriers positionable therein economically available to the buying public.

Still yet another object of the present invention is to provide a new and improved tool carrying system including a housing mounted on a truck and individual tool carriers positionable therein which provide in the apparatuses and methods of the prior art some of the advantages thereof, while simultaneously overcoming some of the disadvantages normally associated therewith.

Still another object of the present invention is to store and transport tools in carriers removably positionable in a housing mounted to a truck.

Lastly, it is an object of the present invention to provide a new and improved tool carrying system including a housing mounted on a truck and individual tool carriers positionable therein comprising a rectangular housing having a parallel floor and roof, parallel sides, a parallel front wall and a door pivotally mounted at its lower edge to the lower rear edge of the floor, the door being of a height essentially equal to the height of the side walls of the housing for closing the rear open end of the housing and positionable in a open orientation to form an angled ramp for the sliding of the tool carriers to exterior of the housing; a plurality of tool carriers, each of the tool carriers being provided with a floor, and with upstanding side, front and rear walls coupled at their lower edge to the side, front and rear edges of the floor, and a handle having front and rear ends secured to the upper end of the front and rear walls with diagonal braces coupling an intermediate portion of the inner surface of each of the front and rear walls to the side walls; and the tool carriers each having on its lower surface a plurality of wheels, a wheel located in each corner.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of the preferred embodiment of the tool carrying system including a housing mounted on a truck and individual tool carriers positionable therein constructed in accordance with the principles of the present invention.

FIG. 2 is an enlarged side elevational view of a portion of the truck shown in FIG. 1 and the housing thereon including the coupling means therebetween.

The same reference numerals refer to the same parts through the various FIGS.

DESCRIPTION OF THE PREFERRED EMBODIMENT

Figure 3:
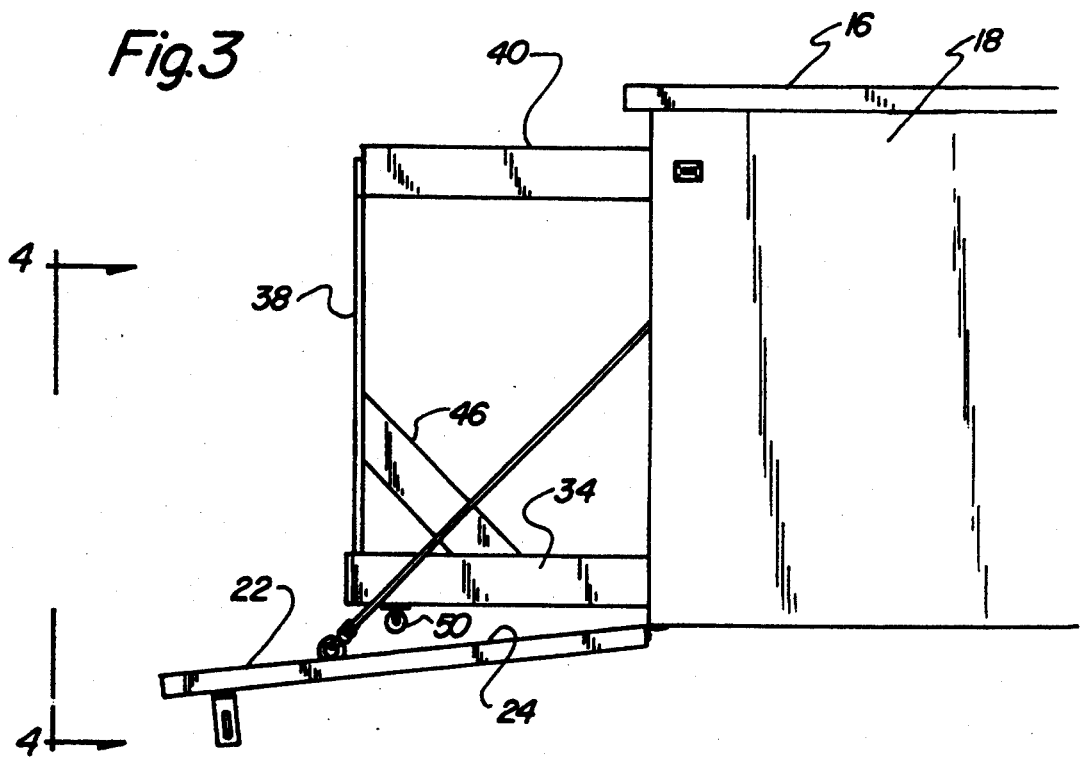
FIG. 3 is a side elevational view of the housing and one of the carriers partially removed.

With reference now to the drawings, and in particular to FIG. 1 thereof, the preferred embodiment of the new and improved tool carrying system including a housing mounted on a truck and individual tool carriers positionable therein embodying the principles and concepts of the present invention and generally designated by the reference numeral 10 will be described.

The present invention, the new and improved tool carrying system including housing mounted on a truck and individual tool carriers positionable therein is a system 10. Such system is comprised of a plurality of components. Such components, in their broadest context, include a housing, tool carrier, wheels, spacers, apertures and upstanding supports. Such components are individually configured and correlated with respect to each other so as to attain the desired objectives.

More specifically, the system 10 has as its encompassing component a rectangular housing 12. Such housing has a parallel floor 14 and roof 16. It has parallel sides 18 and a front wall 20 parallel with a door 22. The door is pivotally mounted at its lower edge to the lower rear edge of the floor. The door has, on its interior surface 24, aluminum coverings 26 to facilitate the movement of rollers thereacross.

Figure 4:
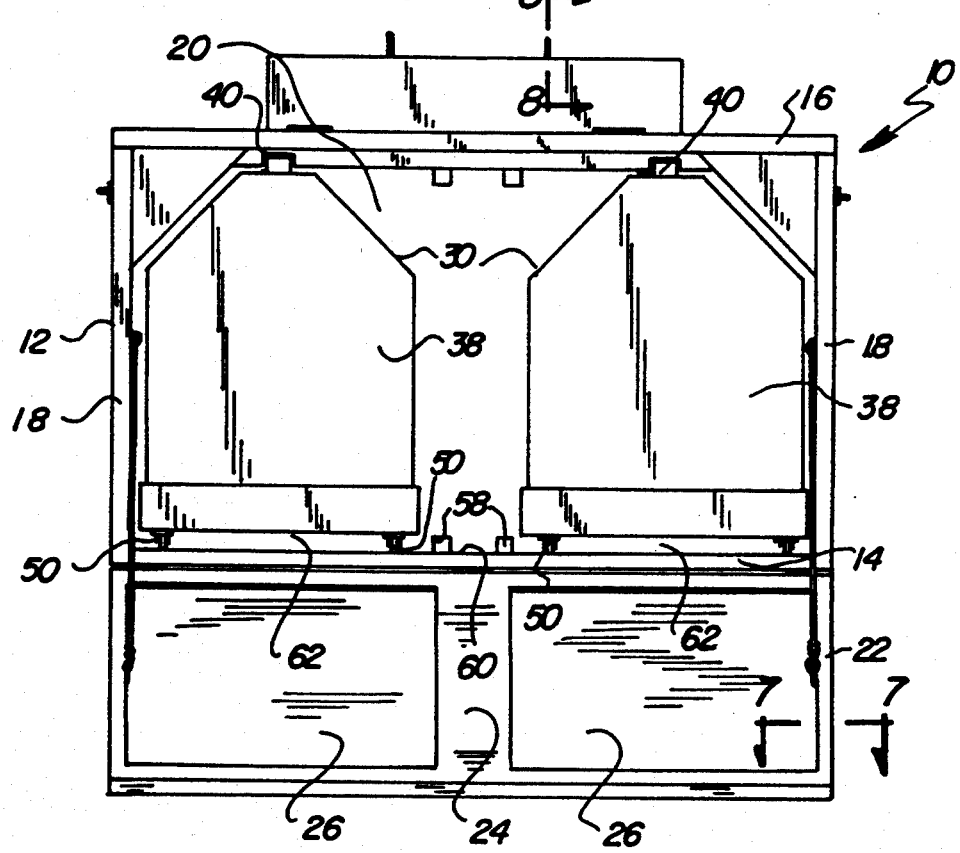
FIG. 4 is a rear elevational view of the device shown in FIGS. 1 and 3 with the door open.
Figure 5:
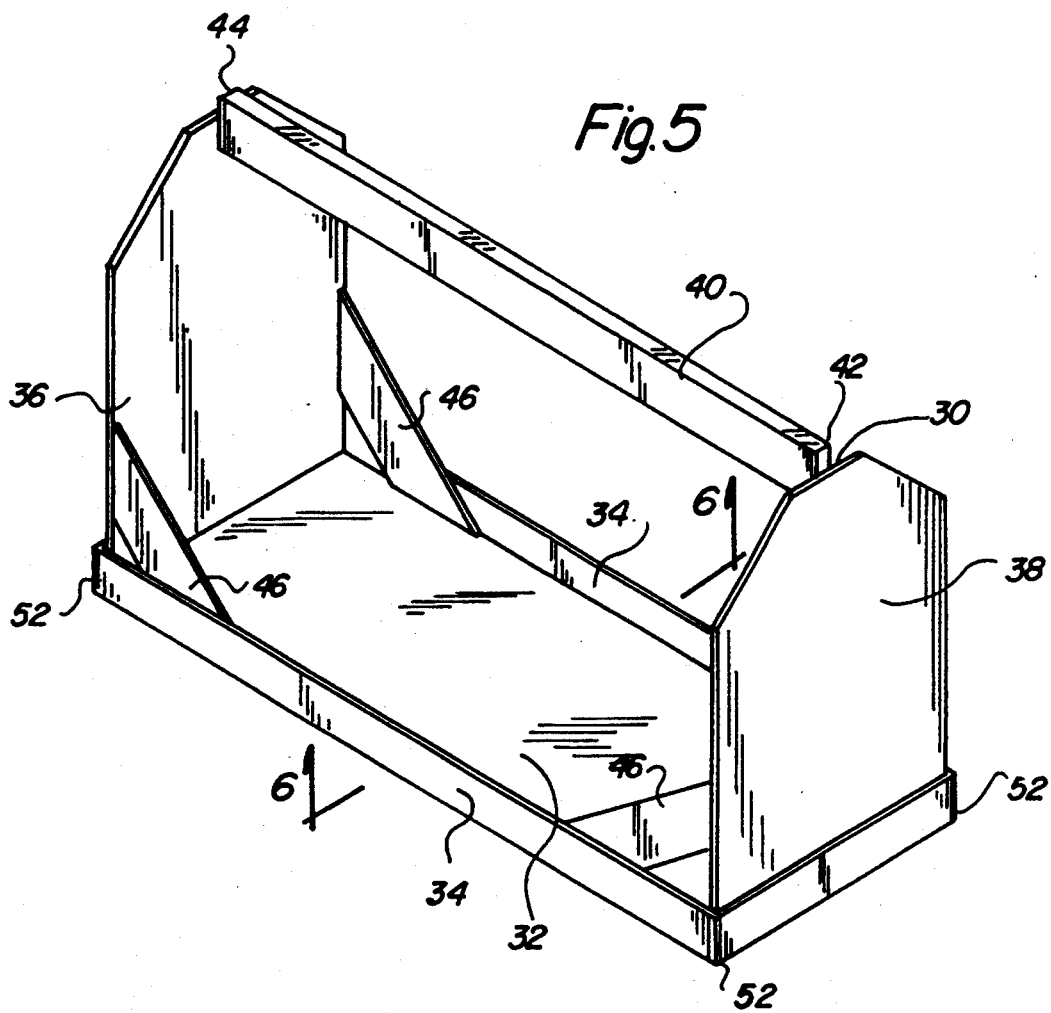
FIG. 5 is a perspective illustration of one of the tool carriers illustrated in FIGS. 3 and 4.
Figure 6:
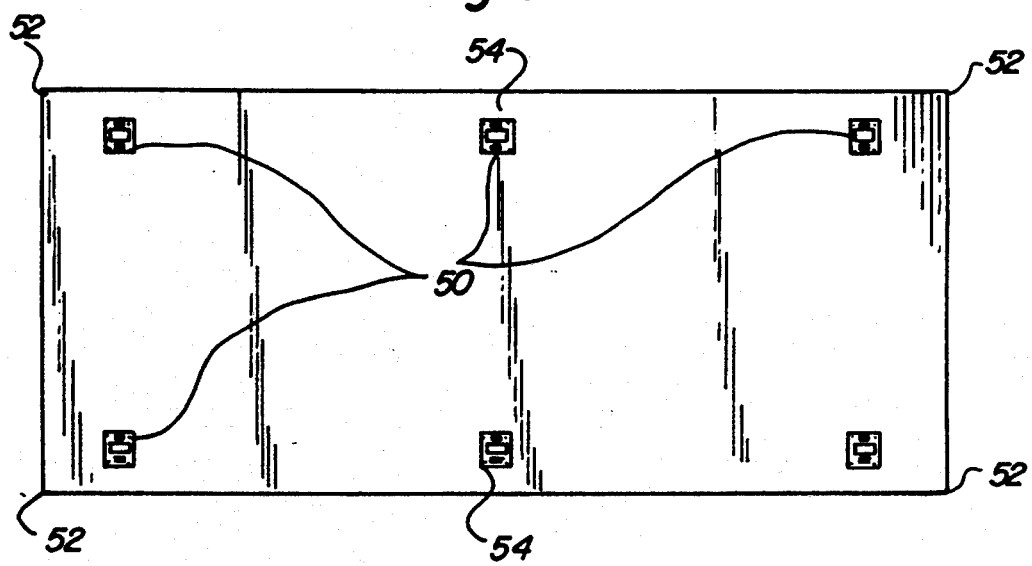
FIG. 6 is a bottom view of the tool carrier taken along line 6—6 of FIG. 5.
Figure 7:
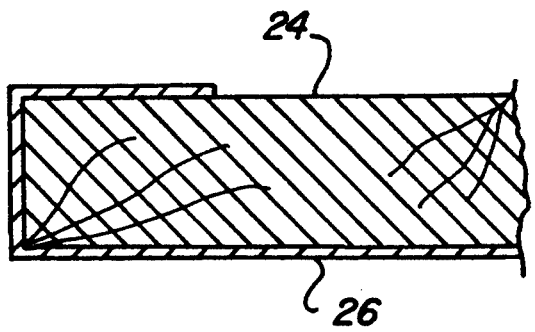
FIG. 7 is a cross sectional view of a cross sectional view of a portion of the door taken along line 7—7 of FIG. 4.
Figure 8:
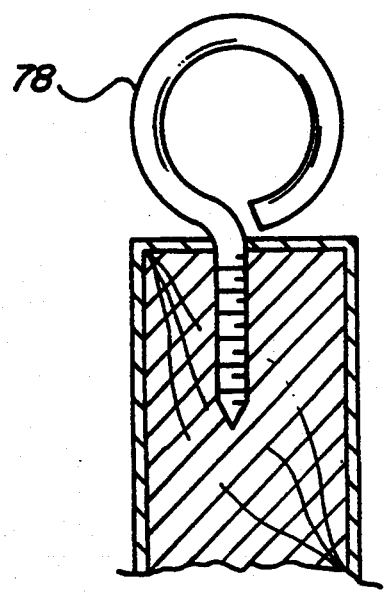
FIG. 8 is a cross sectional view of the latter carrier secured to the top of the housing as illustrated in FIGS. 1 and 4.

The door is of a height essentially equal to the height of the side walls of the housing for constituting a closure for the container. The door functions for closing the rear end of the housing. It is positionable in an open orientation as shown in FIGS. 3 and 4 to form an angled ramp for the sliding of tool carriers to exterior of the housing as will be later described.

Next provided within the system 10 are a plurality of tool carriers 30. In the preferred embodiment, there are two such carriers of identical construction. Each of the tool carriers is provided with a floor 32. Each has upstanding side walls 34, and a front and rear wall 36 and 38. They are coupled at their lower edges to the side, front and rear edges of the floor. A handle 40 is provided as a part of the tool carriers. Each handle has a front end 42 and a rear end 44. Such ends are secured to the upper ends of the front and rear walls. For support, diagonal braces 46 couple an intermediate portion of the inner surface of each of the front and rear walls to the side walls adjacent an interior extent thereof.

The tool carriers each have on its lower surface a plurality of wheels 50. The wheels are preferably in castor form to allow sliding at indifferent directions. One wheel is located in each corner 52. In addition, it is preferred to have an additional wheel along the side edges at an intermediate location 54 therebetween.

Upwardly extending spacers 58 are preferably positioned on the upper surface 60 of the floor of the housing. Such spacers function to divide the housing in two laterally offset zones 62. Each zone is sized to receive one of the tool carriers.

Apertures 66 are formed in the floor of the housing adjacent to the leading edge. Bolts 68 and associated nuts 70 are adapted to hold the housing in position by passing through an aperture 72 in the floor or flat bed of a truck.

Lastly provided is an upstanding support 76. Such support is secured to the upper surface of the roof of the housing. Hooks 78 are preferably provided with respect thereto. In addition, associated hooks are secured to the side walls of the housing adjacent to the rear end thereof. Together the hooks function as tie-downs for a ladder or the like.

Carpenters and mechanics need to take a variety of tools and equipment with them for each job. These may include wrenches, sandpaper, electric saws, drills, a hacksaw, a socket wrench set, etc. Most professionals have a toolbox to carry everything, but conventional toolboxes make it difficult for carpenters and other professionals to keep track of all this equipment. They must be certain when traveling to a job site that they have all the tools they will need for the job. If carpenters arrive at a job and find they have forgotten a crucial tool, they must return to the shop thereby losing valuable time. Most jobs are estimated on the amount of time it will take to complete.

The present invention provides a solution to this problem by making it easier to customize the shelves for different types of work. It is made of wood and wrapped in aluminum and bolts to the bottom of a pickup truck or van through predrilled holes in the bottom of the unit. It has two doors that swing open to reveal two shelves. Each shelve slides out on six steel wheels, so carpenters or other tradespeople can fill a tray, and slide it out to the job site. Companies that have more than one trade could set up a toolbox for each type of work and travel to the job site in a single vehicle.

The present invention should appeal to carpenters, mechanics, or the do-it-yourself who has a large amount of tools and wants to organize them for different purposes.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved tool carrying system including a housing adapted to be mounted on a truck and individual tool carriers positionable therein comprising, in combination:

a rectangular housing having a parallel floor and roof, parallel sides, a parallel front wall and a door pivotally mounted at its lower edge to the lower rear edge of the floor, the door having on the interior surface aluminum coverings to facilitate the movement of rollers thereacross the door being of a height essentially equal to the height of the side walls of the housing for closing the rear open end of the housing and positionable in an open orientation to form an angled ramp for the sliding of the tool carriers to exterior of the housing;

a plurality of tool carriers, each of the tool carriers being provided with a floor, and with upstanding side, front and rear walls coupled at their lower edge to the side, front and rear edges of the floor, and a handle having front and rear ends secured to the upper end of the front and rear walls with diagonal braces coupling an intermediate portion of the inner surface of each of the front and rear walls to the side walls;

the tool carriers each having on its lower surface a plurality of wheels, a wheel located in each corner, and along the side edges at an intermediate location therebetween;

upwardly extending spacers positioned on the upper surface on the floor of the housing to divide the housing into two laterally offset zones each sized to receive one of the tool carriers;

apertures formed in the floor of the housing adjacent to the leading edge with bolts and associated nuts adapted to hold the housing in position on the flat bed of a truck; and an upstanding support secured to the upper surface of the roof of the housing with hooks secured thereto and with associated hooks secured to the side walls of the housing adjacent to the rear end adapted to function as tie-downs for a ladder.

2. A tool carrying system including a housing adapted to be mounted on a truck and individual tool carriers positionable therein comprising:

a rectangular housing having a parallel floor and roof, parallel sides, a parallel front wall and a door pivotally mounted at its lower edge to the lower rear edge of the floor, the door being of a height essentially equal to the height of the side walls of the housing for closing the rear open end of the housing and positionable in a open orientation to form an angled ramp for the sliding of the tool carriers to exterior of the housing;

a plurality of tool carriers, each of the tool carriers being provided with a floor, and with upstanding side, front and rear walls coupled at their lower edge to the side, front and rear edges of the floor, and a handle having front and rear ends secured to the upper end of the front and rear walls with diagonal braces coupling an intermediate portion of the inner surface of each of the front and rear walls to the side walls; and the tool carriers each having on its lower surface a plurality of wheels, a wheel located in each corner.

3. The system as set forth in claim 2 and further including:

upwardly extending spacers positioned on the upper surface on the floor of the housing to divide the housing into two laterally offset zones each sized to receive one of the tool carriers, 4. The system as set forth in claim 2 and further including:

apertures formed in the floor of the housing adjacent to the leading edge with bolts and associated nuts adapted to hold the housing in position on the flat bed of a truck, 5. The system as set forth in claim 2 and further including:

an upstanding support secured to the upper surface of the roof of the housing with hooks secured thereto and with associated hooks secured to the side walls of the housing adjacent to the rear end adapted to function as tie-downs for a ladder.

* * * * *